United States Patent [19]

Wiedenheft, III et al.

[11] Patent Number: 5,884,877

[45] Date of Patent: Mar. 23, 1999

[54] ROLLER EXCITATION DEVICE

[75] Inventors: John H. Wiedenheft, III, Norwich; Charles E. Gray, North Stonington, both of Conn.

[73] Assignee: The United States of America as represented by the Secretary of the Navy, Washington, D.C.

[21] Appl. No.: 976,132

[22] Filed: Sep. 29, 1997

[51] Int. Cl.[6] .................................................... F16L 3/16
[52] U.S. Cl. ............................................. 248/55; 248/49
[58] Field of Search ..................... 248/49, 55; 114/179, 114/181

[56] References Cited

U.S. PATENT DOCUMENTS 2,891,749  6/1959  Heverly ..................................... 248/49

Primary Examiner—Ramon O. Ramirez
Assistant Examiner—Robert Lipcsik
Attorney, Agent, or Firm—Michael J. McGowan; Prithvi C. Lall; Robert W. Gauthier

[57] ABSTRACT

The arrangement is directed to a roller excitation device for frictionally engaging and turning rollers of a roller box assembly. The roller box assembly is of the type that includes a generally U-shaped housing having a partial tube which covers the open end of the housing, and a plurality of rollers captured by the housing. The rollers and partial tube define a space through which a cable is received. The arrangement being such that the rollers are adapted to roll upon engaging the cable located in the space defined by the tube and rollers. The roller excitation device includes a body portion fabricated from resilient material and sized for occupying the space defined by the tube and roller and for frictionally engaging the rollers, and means for moving the body portion over the rollers. Preferably, the body portion has an outer surface with a plurality of ribs extending outwardly along the circumference of the body portion. The ribs engage the rollers for causing them to turn upon moving the body portion thereover.

13 Claims, 6 Drawing Sheets

ROLLER EXCITATION DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1). Field of the Invention

This invention relates generally to pipes having roller boxes located at bends in the pipes for aiding the movement of cables positioned within the pipes, and more particularly to a roller excitation device which is used to cause rollers housed by such roller boxes to roll or turn.

(2). Description of the Prior Art

In certain applications, there is a pipe located outboard of a vessel. This pipe has a cable located therein. Typically, the pipe has bends formed in it, and, in order to minimize the friction encountered by the cable as it passes through the pipe and negotiates the bends, roller box assemblies are positioned at these bends. FIG. 1 illustrates a vessel wall 10 with a section of pipe 12 having a pair of roller box assemblies, each generally indicated at 14, positioned at the bends of the pipe 12. As shown, a roller box assembly 14 can be positioned anywhere along the length of the pipe 12 where it bends or turns.

FIGS. 2 and 3 illustrate a single roller box assembly 14 in plan view and cross section view, respectively. As shown in FIG. 2, the roller box assembly 14 has an arcuate housing 16 and a plurality of rollers, each indicated at 18, positioned within the housing 16. Referring to FIG. 3, the housing 16 of the roller box assembly 14 has a generally U-shaped cross section. Specifically, the housing 16 has a partial tube 20 which covers the open end of the housing 16 and a plurality of roller shafts or pins 22 captured by the housing 16, each roller shaft 22 having the roller 18 mounted thereon. The rollers 18 extend perpendicularly with respect to the direction of a cable 24 located in the space defined by the partial tube 20 and the rollers 18. The arrangement is such that each roller 18 is adapted to roll upon engaging the cable 24 when moving the cable 24 linearly through pipe 12 and roller box assemblies 14. This rotation of the roller 18 upon engaging the cable 24 eases the linear motion of the cable 24 passing through the pipe 12 at the bend.

Occasionally, rollers 18 and/or roller shafts 22 become immobile or seize due to a variety of causes (e.g., lack of lubrication, foreign objects preventing rotation of the rollers, etc.). In order to ensure that the roller box assemblies 14 perform their intended function, it is necessary to both test the assemblies 14 and to identify rollers 18 that are seized. Presently, there is no way of detecting or identifying whether rollers 18 are functional or non-functional. The present invention is provided for overcoming these above-noted constraints.

SUMMARY OF THE INVENTION

Accordingly, it is an object of the present invention to provide a roller excitation device which is capable of frictionally engaging rollers of roller box assemblies for causing the rollers to turn or rotate upon passing the device over the rollers.

Another object is that of such a roller excitation device which is capable of identifying seized rollers.

A further object of the present invention is that of a roller excitation device which is simple in design and easy to use.

The instant invention is directed to a roller excitation device for frictionally engaging and turning rollers of a roller box assembly. The roller box assembly is of the type that includes a generally U-shaped housing having a partial tube which covers the open end of the housing, and a plurality of rollers captured by the housing. The rollers and partial tube define a space through which a cable is received. The arrangement being such that the rollers are adapted to roll upon engaging the cable located in the space defined by the tube and rollers. The roller excitation device comprises a body portion fabricated from resilient material and sized for occupying the space defined by the tube and roller and for frictionally engaging the rollers, and means for moving the body portion over the rollers.

In a second aspect of the invention, the body portion has an outer surface with a plurality of ribs extending outwardly along the circumference of the body portion. The ribs engage the rollers for causing them to turn upon moving the body portion thereover.

In a third aspect of the invention, a video camera is mounted on the moving means of the body portion for displaying the rotation or non-rotation of the rollers.

BRIEF DESCRIPTION OF THE DRAWINGS

A more complete understanding of the invention and many of the attendant advantages thereto will be readily appreciated as the same become better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 5A:
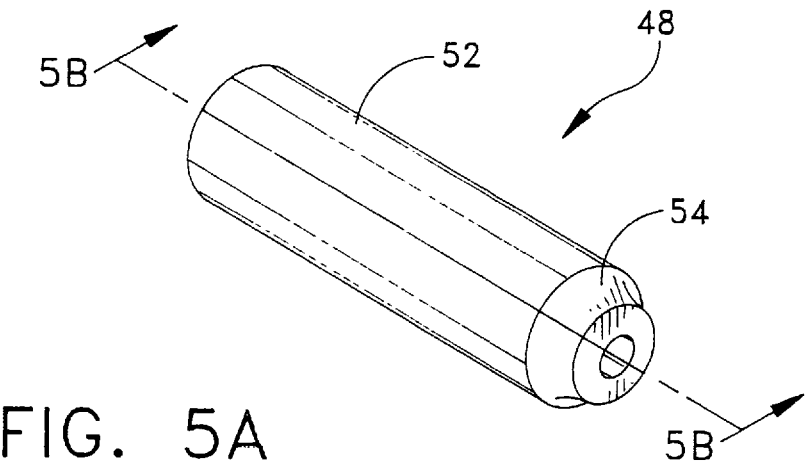
FIG. 5A is a perspective view of a center bar of the roller excitation device.
Figure 5B:
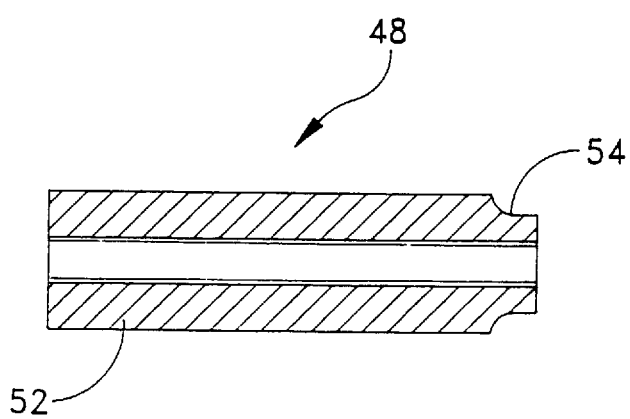
FIG. 5B is a cross-sectional view of the center bar taken along line 5B—5B of FIG. 5A.
Figure 6:
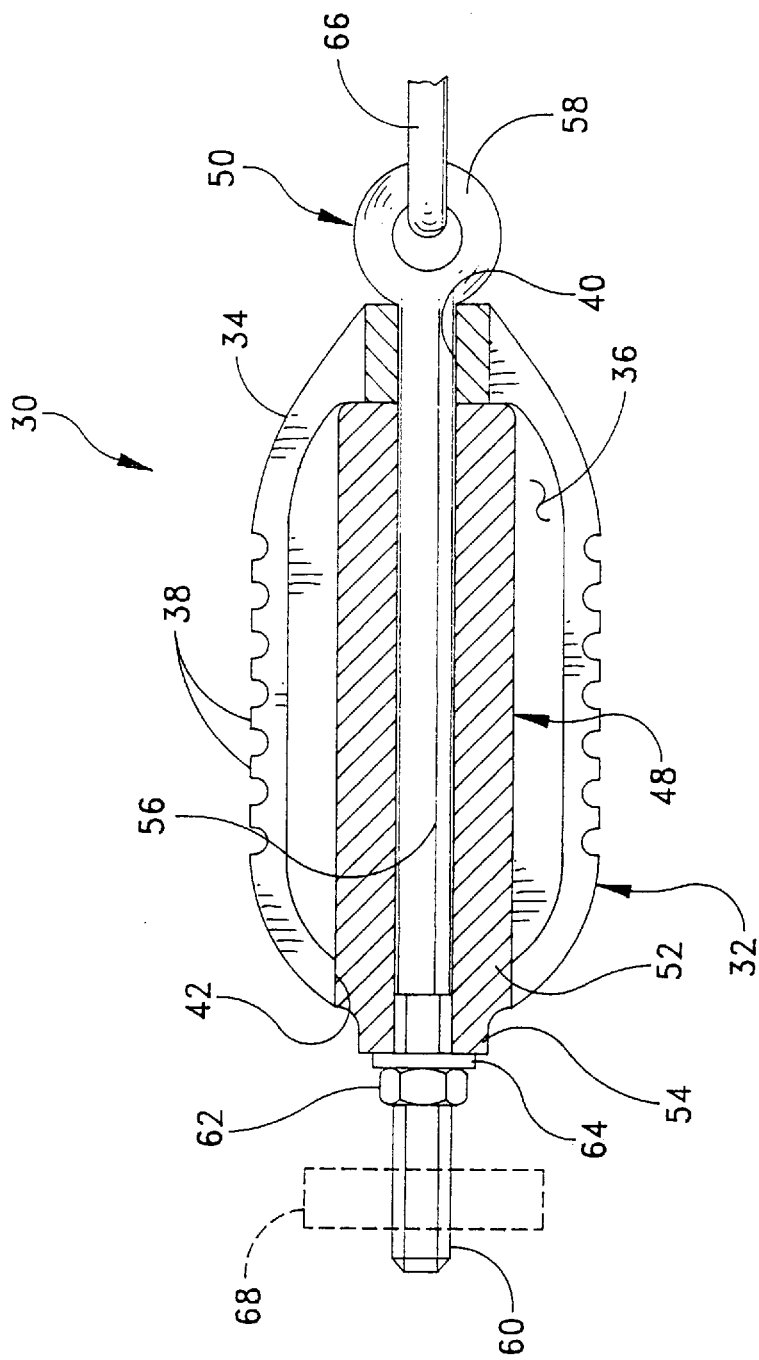
FIG. 6 is a partial cross-sectional view of the body portion and center bar in assembled relation by means of an eye hook and nut fastener assembly.

Referring now to the drawing figures, and more particularly FIGS. 4–6, there is generally indicated at 30 a roller excitation device of the present invention. The roller excitation device 30 is suited for insertion within the pipe 12 and roller box assembly 14 for the purpose of rotating or turning rollers 18 of the roller box assembly 14. Prior to the instant invention, there was no way of determining whether rollers 18 are seized, thus failing to aid the roller box assembly 14 in its purpose of easing the movement of the cable 24 therethrough.

Figure 1:
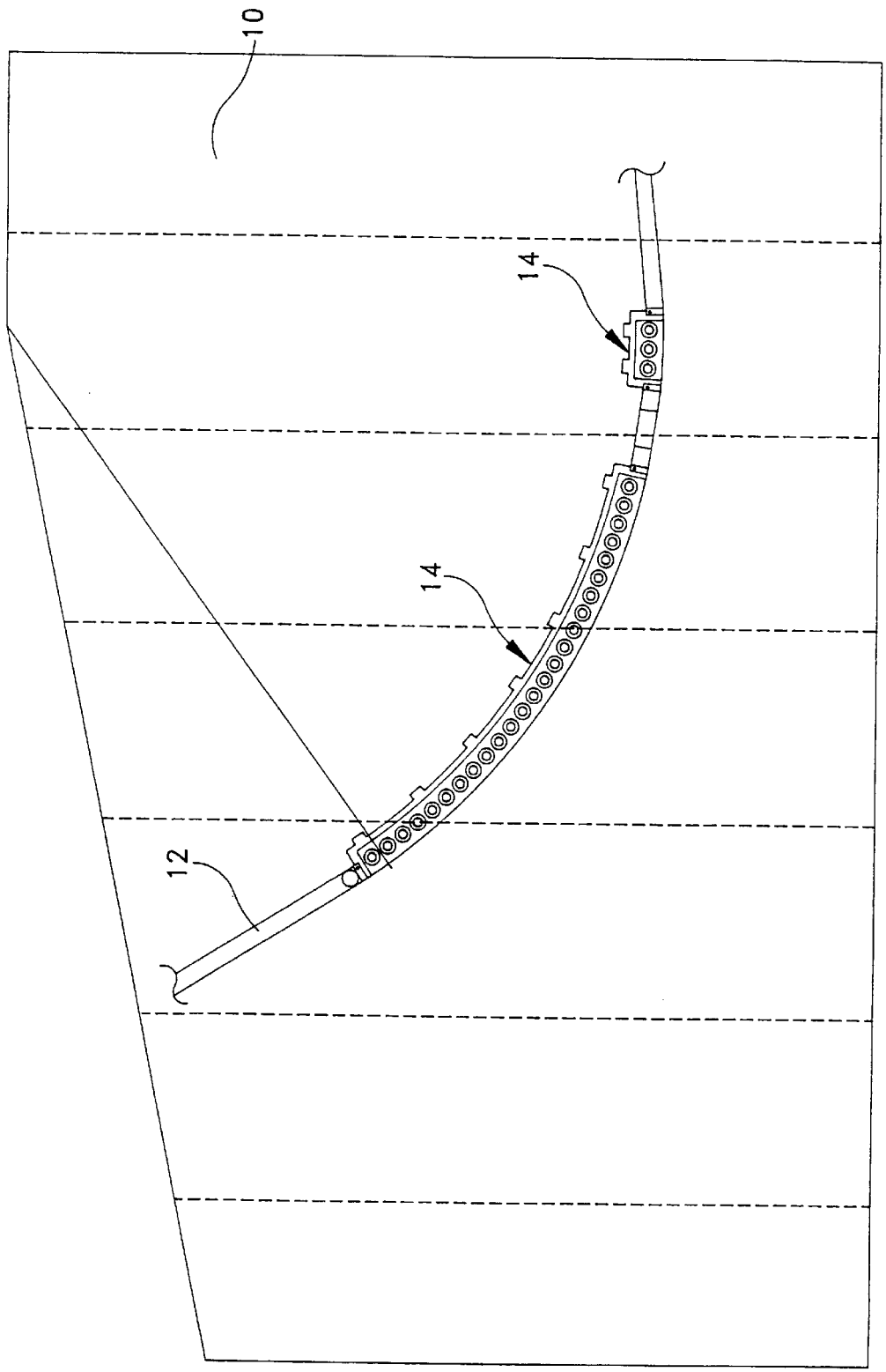
FIG. 1 is a top plan view of a pipe and a roller box assembly located at points where the pipe turns or curves.
Figure 2:
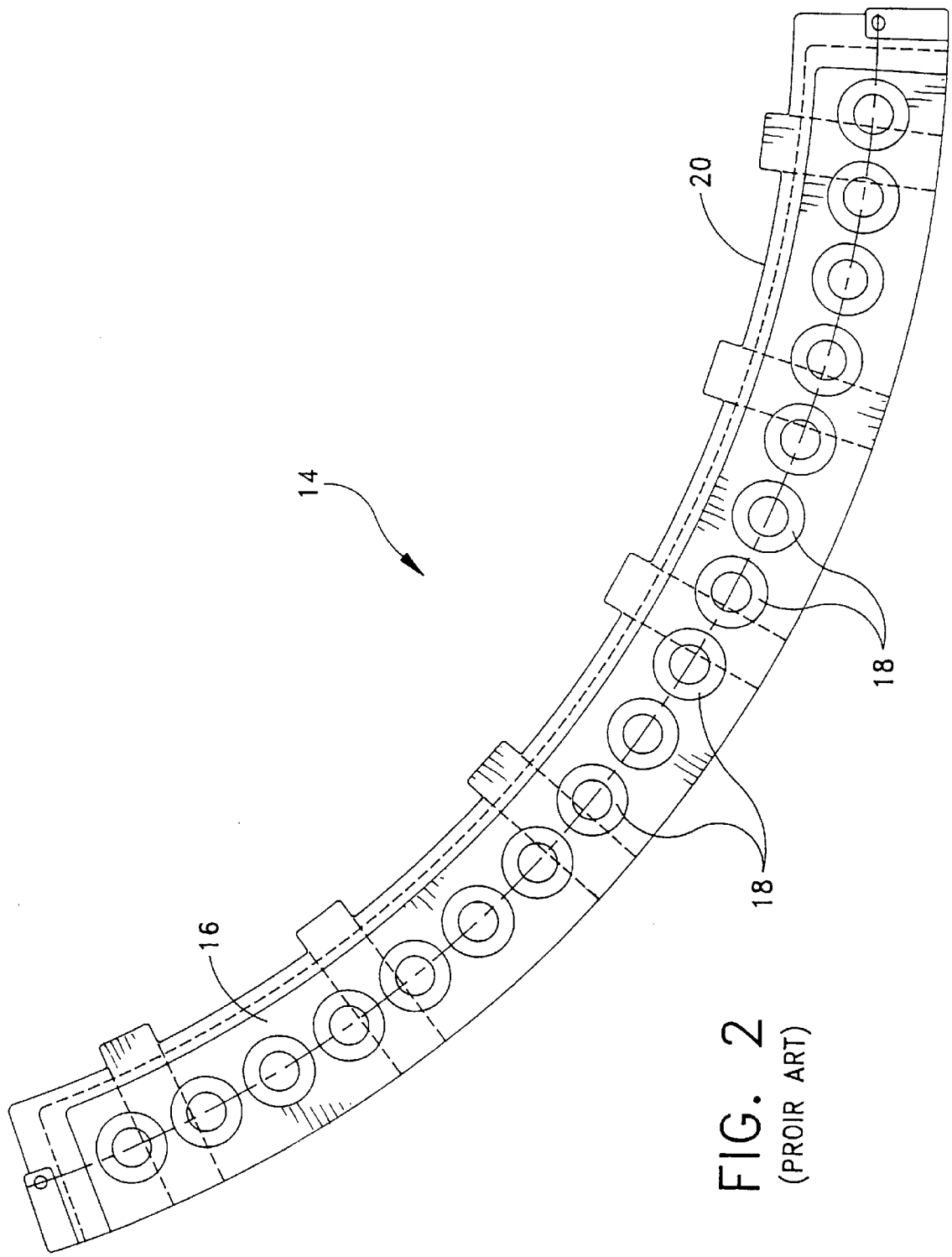
FIG. 2 is an enlarged top plan view of the roller box assembly illustrated in FIG. 1.
Figure 3:
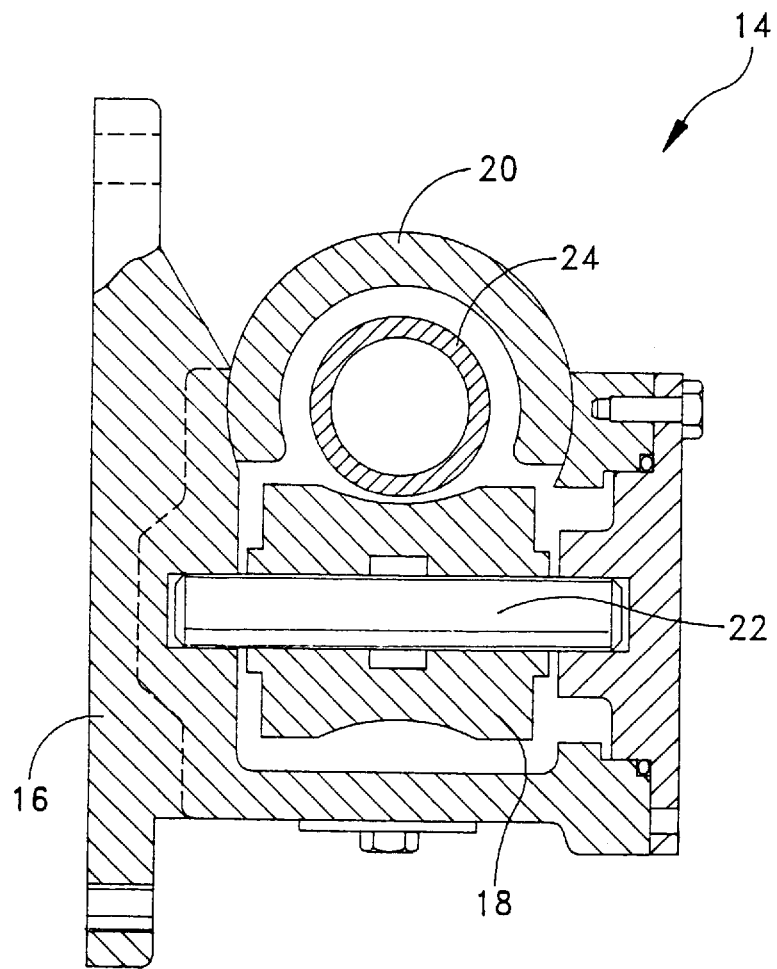
FIG. 3 is an even further enlarged cross-sectional view of the roller box assembly.
Figure 4A:
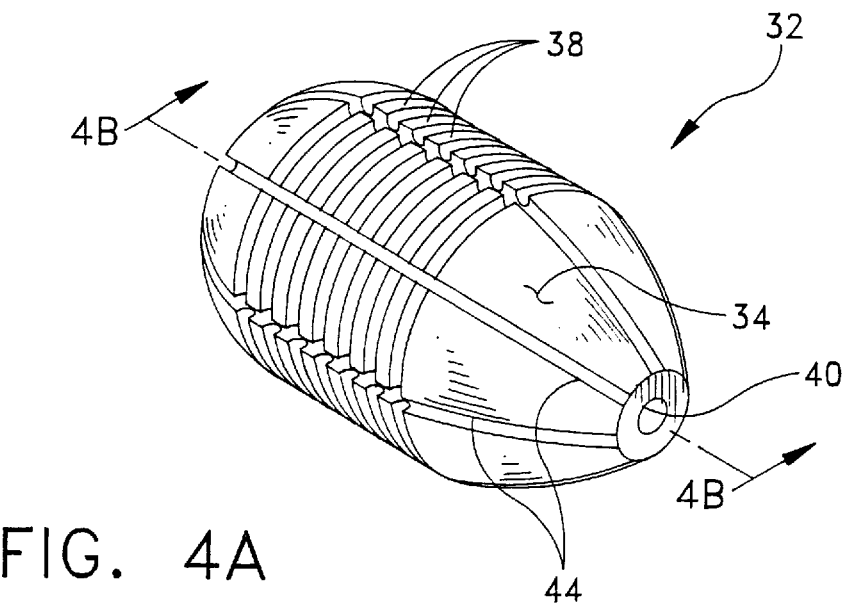
FIG. 4A is a perspective view of a body portion of a roller excitation device of the present invention.
Figure 4B:
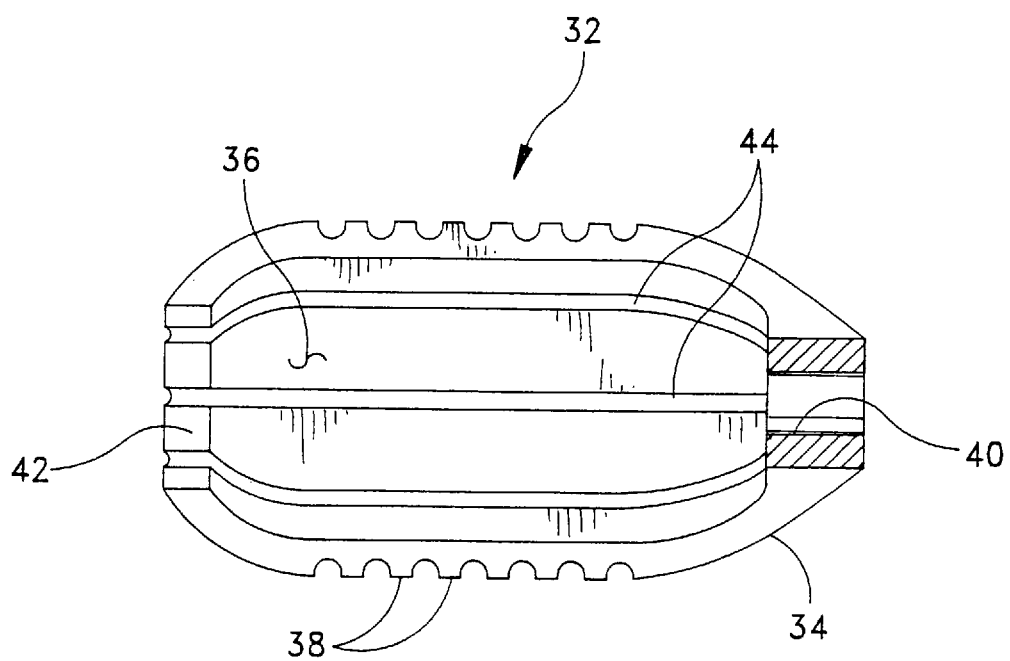
FIG. 4B is a cross-sectional view of the body portion taken along line 4B—4B of FIG. 4A.

FIGS. 4A and 4B illustrate a hollow body portion generally indicated at 32 of the roller excitation device 30. As shown, the body portion 32 is oval-shaped in cross section, and has an outer surface 34 and an inner surface 36. The outer surface 34 of the body portion 32 has a plurality of outwardly projecting ribs, each indicated at 38, formed along the outer circumference of the body portion 32. These ribs 38 are provided for engaging the rollers 18 which cause the rollers 18 to turn upon movement of the body portion 32 over the rollers 18.

The engagement of the ribs 38 against the rollers 18 is created by sizing the body portion 32 slightly larger than the space defined by the partial tube 20 and the rollers 18. Preferably, the body portion 32 is fabricated from resilient material which enables the body portion 32 to slightly deform. The slight deformation of the body portion 32 ensures that positive pressure is maintained on the rollers 18 by the ribs 38 of the body portion 32. The material is relatively smooth so that the portion of the body portion 32 not engaging the rollers, but instead engaging the partial tube 20 or the pipe 12, slides smoothly along the inner surfaces thereof. However, a sufficient amount of friction is applied on the rollers 18 to cause unseized and partially seized rollers 18 to turn when passing the roller excitation device 30 therethrough.

The body portion 32 of the roller excitation device 30 also has an elongate bore 40 formed at one end thereof and an open end 42 formed at its other end. Longitudinal slits 44 are formed in the body portion 32 extending from the elongate bore 40 end towards the open end 42. The slits 44 enable the body portion 32 to slightly compress when engaging the housing 16 and the rollers 18. This construction even further ensures the positive engagement of the ribs 38 with the rollers 18.

It should be noted that alternative materials can be chosen which are more compatible with the medium that the roller excitation device 30 is operating in. In addition, it should be understood that the size and geometric shape of the roller excitation device 30 can be modified in order to accommodate different pipe and roller box assembly configurations.

Turning now to FIGS. 5A, 5B and 6, to move the body portion 32 of the roller excitation device 30 over the rollers 18, a center bar 48 is positioned within the body portion 32 and a fastener assembly generally indicated at 50 passes through and attaches the center bar 48 to the body portion 32. The center bar 48 includes a cylindrical wall 52 having a sufficient thickness, the cylindrical wall 52 tapering down to a reduced neck portion 54 at one end thereof. The center bar 48 is inserted within the body portion 32 in the manner identified in FIG. 6 with the end of the cylindrical wall 52 engaging the end of the body portion 32 forming the elongate bore 40 and the reduced neck portion 54 extending through the open end 42 thereof.

The fastener assembly 50 includes a bolt 56 having an eye hook 58 at one end thereof and a threaded rod 60 at its opposite end. The threaded rod 60 extends through the center bar 48 so that the eye hook 58 engages the end of the body portion 32 forming the elongate bore 40 and the threaded rod 60 extends out of the reduced neck portion 54 of the center bar 48. A nut 62 and a washer 64 are received over the threaded rod 60 with the nut 62 threadably engaging the threaded rod 60 for securing the bolt 56, center bar 48 and body portion 32 in assembled relation. A tether 66 is secured to the eye hook 58 of the bolt 56 in any reasonable manner for pulling the roller excitation device 30 through the pipe 12 and roller box assemblies 14.

Referring to FIG. 6, schematically illustrated at 68 is a video camera attached to the bolt 56 of the moving means 46 for displaying the rotation or non-rotation of the rollers 18.

It should be noted that any suitable electronic device 68 capable of resolving rotation or non-rotation of the rollers 18, either visually or non-visually, can be used in place of the video camera 68, and that any suitable method of attachment of the video camera 68 to the roller excitation device 30 of the present invention can be used as well and still fall within the scope of the present invention. The video camera 68 is extremely useful in that the exact location of operable and non-operable rollers 18 can be identified without taking the roller box assembly 14 apart.

During use, the assembled roller excitation device 30 is attached to a tether 66 (e.g., a wire roped cable) and pulled through the pipe 12. Upon reaching a roller box assembly 14, the body portion 32 of the roller excitation device 30 engages the inner surface of the partial tube 20 and the rollers 18. The engagement of the ribs 38 of the body portion 32 against the rollers 18 causes unseized rollers 18 to rotate or turn. The engagement of ribs 38 of the body portion 32 against the rollers 18 is also sufficiently strong to cause partially seized rollers 18 to rotate and turn. However, seized rollers 18 which are incapable of rolling even after being engaged by the ribs 38 of the device 30 can be identified by the video camera 68 that is attached to the device 30. Thus, it should be observed that the instant invention is particularly effective in causing the rotation of rollers 18 of a roller box assembly 14 and in identifying seized rollers 18.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A roller excitation device for frictionally engaging and turning rollers of a roller box in combination with said roller box assembly, said roller box assembly including a generally U-shaped housing having a partial tube which covers the open end of the housing and a plurality of rollers captured by the housing, the rollers and partial tube defining a space through which a cable is received, the arrangement being such that the rollers are adapted to roll upon engaging the cable located in the space defined by the partial tube and rollers, the roller excitation device comprising:

a body portion fabricated from resilient material and sized for occupying the space defined by the partial tube and rollers, the body portion frictionally engaging the rollers; and means for moving the body portion over the rollers.

2. The roller excitation device as set forth in claim 1, said body portion having an outer surface with a plurality of ribs extending outwardly along the circumference of the body portion, said ribs engaging the rollers for causing them to turn upon moving the body portion thereover with said moving means.

3. The roller excitation device as set forth in claim 2, said body portion being generally oval-shaped in cross section along an axis generally parallel with a longitudinal axis of the roller box assembly.

4. The roller excitation device as set forth in claim 1, said means for moving the body portion over the rollers comprising a center bar which is positioned within the body portion and a fastener assembly attached to the center bar.

5. The roller excitation device as set forth in claim 4, said fastener assembly being attached to a tether used to pull the roller excitation device through the partial tube.

6. The roller excitation device as set forth in claim 4, said fastener assembly comprising a bolt having an eye hook and a threaded rod which extends axially through the center bar, and a nut which threadably engages the threaded rod for capturing the center bar between the eye hook and the nut.

7. The roller excitation device as set forth in claim 1 further comprising a video camera attached to said moving means for displaying the rotation or non-rotation of the rollers.

8. The roller excitation device as set forth in claim 2 further comprising means for moving the body portion over the rollers.

9. The roller excitation device as set forth in claim 8, said means for moving the body portion over the rollers comprising a center bar which is positioned within the body portion and a fastener assembly attached to the center bar.

10. The roller excitation device as set forth in claim 9, said fastener assembly being attached to a tether used to pull the roller excitation device through the partial tube.

11. The roller excitation device as set forth in claim 9, said fastener assembly comprising a bolt having an eye hook and a threaded rod which extends axially through the center bar, and a nut which threadably engages the threaded rod for capturing the center bar between the eye hook and the nut.

12. The roller excitation device as set forth in claim 8 further comprising a video camera attached to said moving means for displaying the rotation or non-rotation of the rollers.

13. A roller excitation device for frictionally engaging and turning rollers of a roller box assembly, said roller box assembly including a generally U-shaped housing having a partial tube which covers the open end of the housing and a plurality of rollers captured by the housing, the rollers and partial tube defining a space through which a cable is received, the arrangement being such that the rollers are adapted to roll upon engaging the cable located in the space defined by the tube and rollers, the roller excitation device comprising:

a body portion fabricated from resilient material and sized for occupying the space defined by the tube and rollers, the body portion frictionally engaging the rollers; and a video camera secured to the body portion for displaying the rotation or non-rotation of the rollers.

\* \* \* \* \*